April 12, 1938. K. K. WHITE 2,114,242
BRAKE CONTROL FOR WINCHES
Filed Nov. 13, 1936 2 Sheets-Sheet 1
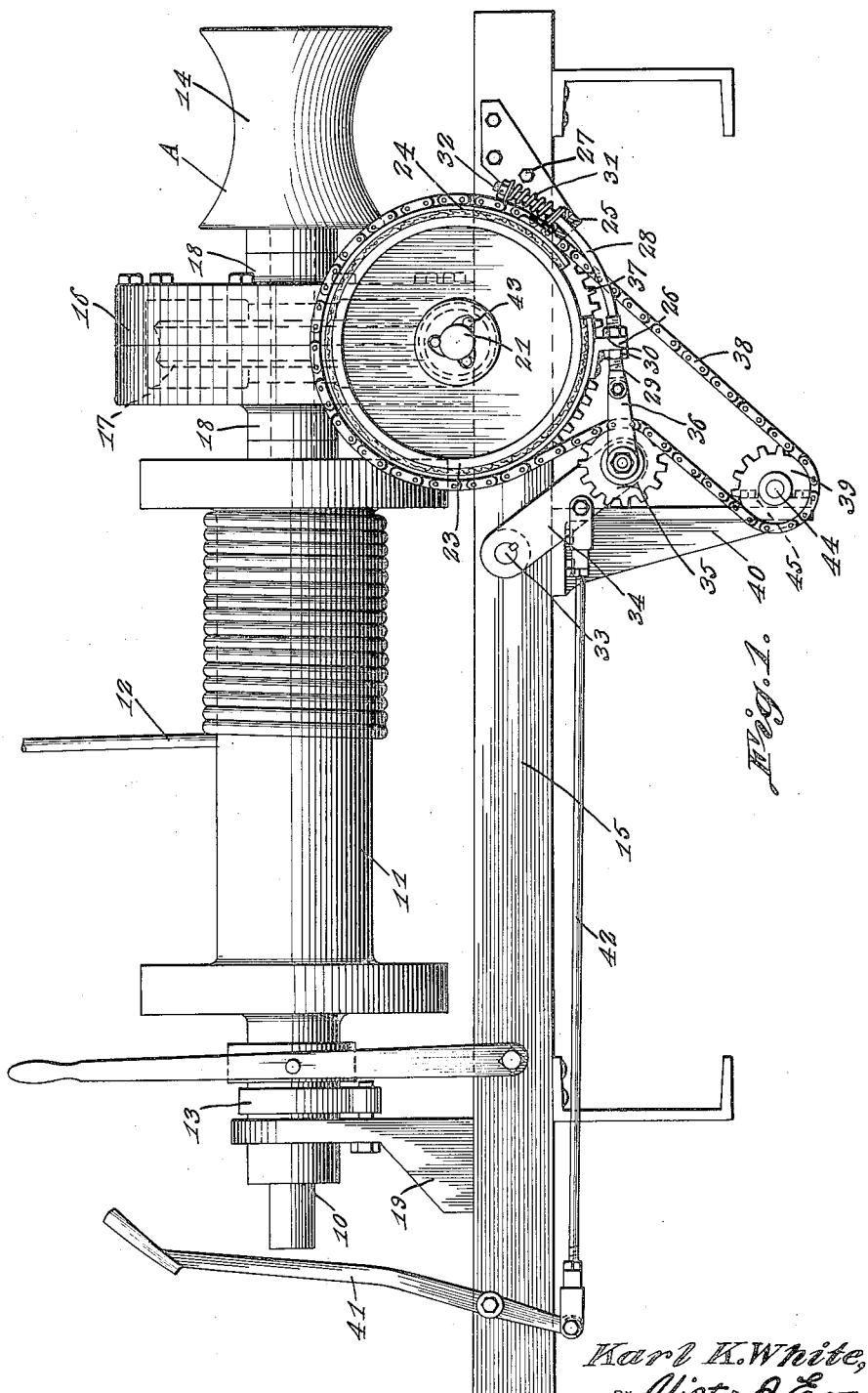

April 12, 1938.　　　　K. K. WHITE　　　　2,114,242
BRAKE CONTROL FOR WINCHES
Filed Nov. 13, 1936　　　2 Sheets-Sheet 2
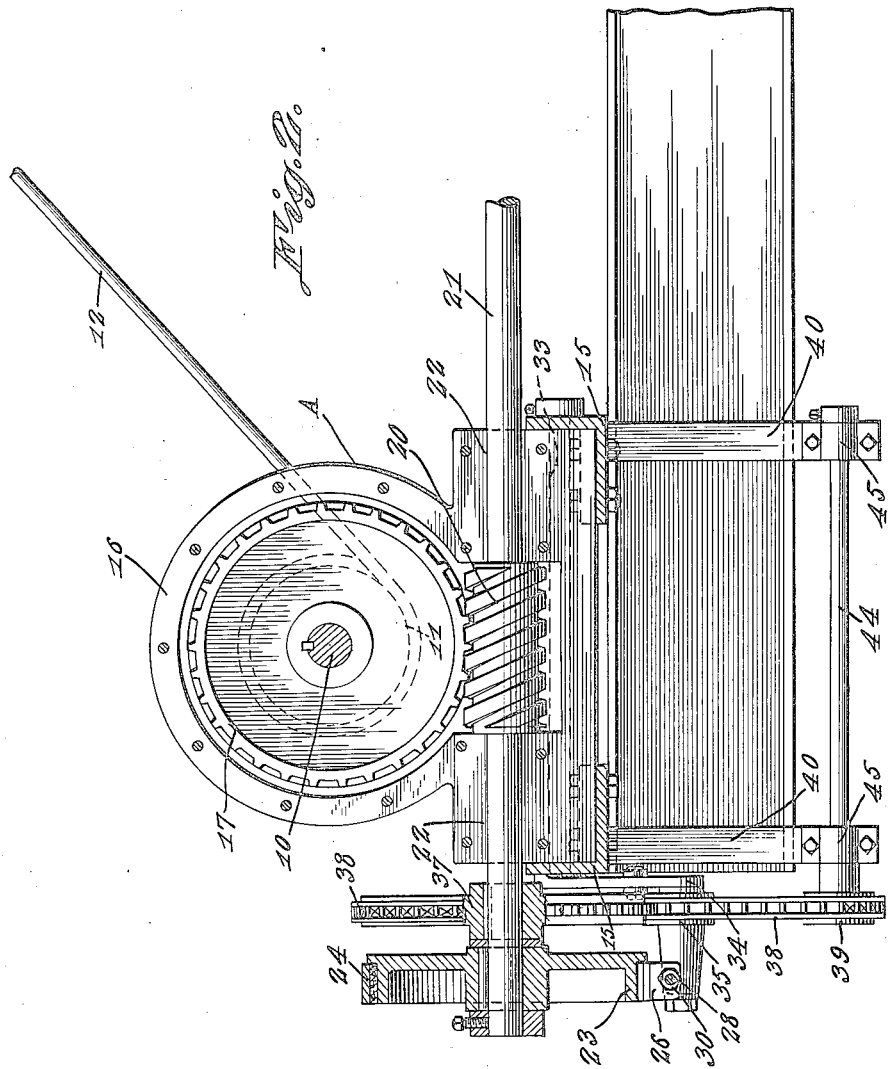
Karl K. White, INVENTOR
BY Victor J. Evans & Co.
ATTORNEYS Patented Apr. 12, 1938

2,114,242

UNITED STATES PATENT OFFICE 2,114,242

BRAKE CONTROL FOR WINCHES

Karl K. White, Eastland, Tex.

Application November 13, 1936, Serial No. 110,765

2 Claims. (Cl. 192—8)

The invention relates to brake control for winches, windlasses or hoists.

The primary object of the invention is the provision of a control of this character, wherein the operation of the brake is had by manual remote control thereby permitting gravity to lower the load without the use of power other than a slight pressure on a hand lever and the instant the pressure is removed from the latter, either purposely or accidentally, braking action takes place for checking the fall of the load.

Another object of the invention is the provision of a brake control of this character, wherein the same when in operation will function automatically and the control is adaptable to worm or spur driven winches, windlasses or hoisting machines.

A further object of the invention is the provision of a control of this character, which is novel in its construction, simple in its make-up, thoroughly reliable and efficient in operation, automatically acting yet permitting hand control of the brakes, strong, durable, and inexpensive to manufacture and install.

With these and other objects in view, the invention consists in the features of construction, combination and arrangement of parts as will be herein after more fully described, illustrated in the accompanying drawings, which disclose the preferred embodiment of the invention and pointed out in the claims hereunto appended.

In the accompanying drawings:

Figure 1 is an elevation of a winch showing the brake control constructed in accordance with the invention applied.

Figure 2 is a vertical transverse sectional view thereof.

Similar reference characters indicate corresponding parts throughout the several views in the drawings.

Referring to the drawings in detail, A designates generally a winch which is of conventional kind and includes an axle 10 while adapted to be wound and unwound on and from a drum 11 is a cable 12, conventional in kind and the said drum being loose upon the axle 10 but susceptible of being made fast thereto through the medium of a clutch 13, and this axle has the cat head 14 fixed thereto.

Upon a platform 15 is fixed a gear housing 16 in which operates a worm gear 17, the housing being provided with bearings 18 for the axle 10 which is passed centrally through this housing, the axle remote from the housing being also supported in a bearing 19 rising from the platform 15.

The worm gear 17 meshes with a worm feed screw 20 on a driven shaft 21 which is journaled at 22 in the housing 16. The shaft carries a brake drum 23 about which is a brake band 24 of the split type. The band 24 near its ends is provided with I brackets 25 and 26, respectively. The I bracket 25 additionally is fixed at 27 to the platform 15 while trained through the said brackets 25 and 26 is an arcuate shaped link in the form of a rod 28 and such rod has a threaded portion 29 for lock nuts 30, these being on opposite sides of the bracket 26 for the adjustment of said rod fixedly with relation to the bracket 26. Surrounding the rod 28 is a coiled tensioning spring 31 it being seated against the bracket 25 and an adjustable nut 32 tapped on one end of this rod. Thus through the nut 32 the tension of the spring 31 can be varied.

Pivotally supported at 33 is a swinging arm 34, the pivot 33 being fixed in the platform 15 and carried by this arm and suitably journaled thereon is an idle sprocket wheel 35, the arm 34 through the medium of a coupling 36 is swingingly attached to the rod 28. Arranged on the shaft 21 is a sprocket wheel 37 having trained thereover an endless sprocket chain 38 which is also trained over a sprocket wheel 39 journaled in a hanger 40 on the platform 15, the sprocket wheel 35 being enmesh with the said chain 38 at the slackening side or stretch thereof.

Pivoted to the platform 15 is a foot pedal or brake lever 41 which has connection with the arm 34 by a throw rod 42 and when such pedal or lever 41 is moved by pressure the arm 34 will be swung causing a pull on the rod 28 against the spring 31 and in this manner expanding the brake band 24, that is to say, when the said pedal or lever has pressure applied thereto in one direction while on the application of pressure in the reverse direction the arm 34 is swung to take up the slack in the chain 38 and at the same time contract the brake band 24 about the drum 23 and thus apply the brake for the stopping of the windlass. The slack of the chain 38 and the position of the sprocket wheel 35 meshing with this chain may be adjusted by the nuts 30. The clutch 43 for the brake drum 23 is of the over-running or one-way type which permits the worm screw shaft 21 to rotate free of the brake drum in a clockwise direction only. When the winch is under load and no power is being applied in a clockwise direction with respect to the shaft 21, the sprocket wheel 37 tends to turn counter-clockwise but by reason of the clutch 43 such wheel is held fixed to the brake drum 23 and such drum includes the outer member of the clutch 43 which latter may be of the conventional cam, ball, roller, ratchet wheel and pawl or friction type adapted to lock in one direction but turn free in the other direction. When the winch is under a load and the brake is released, the shaft 21 locks through the clutch 43 with brake drum 23 and the sprocket wheel 37 and the chain 38 will all move in a counterclockwise direction.

The sprocket wheel 39 has its shaft 44 which is journaled in bearings 45 adapted for a power take-off.

The sprocket wheel 35 is a floating one and through the coupling 36 is connected with the rod 28.

On elevating a load the spocket wheel 37 rotates in a clockwise direction and the floating sprocket 35 takes up most of the slack in the said chain 38 at its slackening side to the extent that when the winch is at rest or the chain is moving in a clockwise direction the brake tension is not lessened or interferred with. This condition is effected by adjusting the position of the sprocket 35. The brake drum 23 when the winch is lifting a load or at rest with or without a load is stationary and held fast by the brake band 24 as the spring 31 acting on the latter causes it to hold the load. This band 24 is anchored through the eye 25 with the platform 15 and the movable end of such band is attached to the rod 28. Now when the rotation of the sprocket wheel 37 is reversed or turned counter-clockwise the slack side of the chain 38 pulls against the locked brake thereby tending to straighten out the chain and thus acting upon the sprocket 35 causing the arm 34 to move outwardly and the coupling 36 connected with the rod 28 releases the tension on the brake by expanding the brake band 24. This releasing of the brake permits the drum 23 to turn counter-clockwise thus permitting the load to be lowered without undue wear on the brake. The operation of the chain against the sprocket 35 when power is applied is reversed to the above and thus the brake control acts to prevent the weight of the load from operating the motor. If the motor or hand power is stopped or reversed the brake instantly and automatically takes hold again without shock.

The shock of sudden stopping is cushioned by the brake band 24. The brake is also susceptible of operation by manual remote control and thereby permitting gravity to lower the load without the use of power other than a slight pressure on the pedal or lever 41. If the hand is removed from the lever or pedal 41 either purposely or accidentally the brake instantly takes hold again and checks the fall of the load by moving the lever or pedal 41 to the left increasing the tension on the brake.

What is claimed is:

1. A brake control for a winch, windlass or hoisting machine comprising a rotary shaft, a brake drum loose on said shaft and having overrun clutch connections therewith, a sprocket wheel fixed to said shaft next to the drum, a supplemental shaft parallel with the first-mentioned shaft and having a sprocket pinion, an endless chain trained over the sprocket wheel and pinion, driven connections between the first-mentioned shaft and the winch, windlass or hoisting machine, a brake band about said drum and having one end fixed and the other end free, a swinging arm pivotally supported and having a sprocket pinion meshing with said sprocket chain at a stretch thereof between the wheel and the first-mentioned pinion and at one side thereof, a link having connection with the swinging arm at the axis of said second-named pinion and also with the free end of the band, means active upon the free end of the band for exerting tension thereon, and a remote control hand operated throw device associated with said arm.

2. A brake control for a winch, windlass or hoisting machine comprising a rotary shaft, a brake drum loose on said shaft and having overrun clutch connections therewith, a sprocket wheel fixed to said shaft next to the drum, a supplemental shaft parallel with the first-mentioned shaft and having a sprocket pinion, an endless chain trained over the sprocket wheel and pinion, driven connections between the first-mentioned shaft and the winch, windlass or hoisting machine, a brake band about said drum and having one end fixed and the other end free, a swinging arm pivotally supported and having a sprocket pinion meshing with said sprocket chain at a stretch thereof between the wheel and the first-mentioned pinion and at one side thereof, a link having connection with the swinging arm at the axis of said second-named pinion and also with the free end of the band, an arcuate shaped rod slidably supported and having connection with the free end of said band, means for adjusting the connection of the rod with said band, a coiled tensioning spring held seated and acting upon the rod for exerting a pull upon the band at the free end thereof, a throw lever remotely supported from said arm, and a throw rod connected with the lever and said arm.

KARL K. WHITE.